United States Patent [19]
Gutman et al.

[11] Patent Number: 4,765,567
[45] Date of Patent: Aug. 23, 1988

[54] HELICOPTER TARGET

[75] Inventors: Meyer M. Gutman, Belair; Christopher N. Lash, Columbia, both of Md.

[73] Assignee: Tech Serv, Inc., Beltsville, Md.

[21] Appl. No.: 24,039

[22] Filed: Mar. 10, 1987

[51] Int. Cl.$^4$ .............................................. B64C 27/02
[52] U.S. Cl. .............................. 244/17.11; 244/17.11; 244/190; 446/36; 273/362
[58] Field of Search ........................ 244/8, 17.11, 190; 446/36-45, 58; 273/362-363

[56] References Cited

U.S. PATENT DOCUMENTS

| | | | |
|---|---|---|---|
| 1,947,901 | 2/1934 | Cierva | 244/8 |
| 2,106,783 | 2/1938 | Wilford | 244/8 |
| 2,192,139 | 2/1940 | Larsen | 244/8 |
| 2,442,846 | 6/1948 | Dunn | |
| 3,141,634 | 7/1964 | Rhoads et al. | 244/190 |
| 3,770,229 | 11/1973 | Seefluth | |
| 3,857,194 | 12/1974 | Guttman | 446/36 |

FOREIGN PATENT DOCUMENTS 726504 10/1942 Fed. Rep. of Germany ........ 446/42

OTHER PUBLICATIONS

"Model Builder" vol. 5, No. 40, Apr. 1975, pp. 7-10, 66, 67.
Description of Hind D Helicopter, Apr. 30, 1980.
Description of Hughes AH-64 Apache Helicopter, admitted prior art.

*Primary Examiner*—Galen Barefoot
*Attorney, Agent, or Firm*—Nixon & Vanderhye

[57] ABSTRACT

A remote-controlled autogyro visually and functionally simulates a helicopter with stub wings (e.g. the Hind D), so that an expendable helicopter-simulating target is produced. The target has a fixed angle rotor shaft, the rotor being solely aerodynamically controlled. The rotor blades have a negative pitch angle, and a positive conning angle. The engine is mounted at the front of the fuselage and has a downthrust angle, and the horizontal stabilizer also slopes downwardly aft. The rotor is at about the center of lift (horizontally) of the wings, and the wing span is about 50-60 percent the length of the fuselage. The ailerons and tail rudder are electrically interconnected. Remote control is provided for the elevators ailerons, and engine speed.

20 Claims, 3 Drawing Sheets

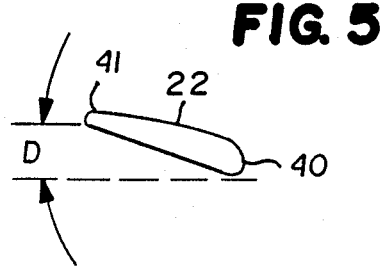
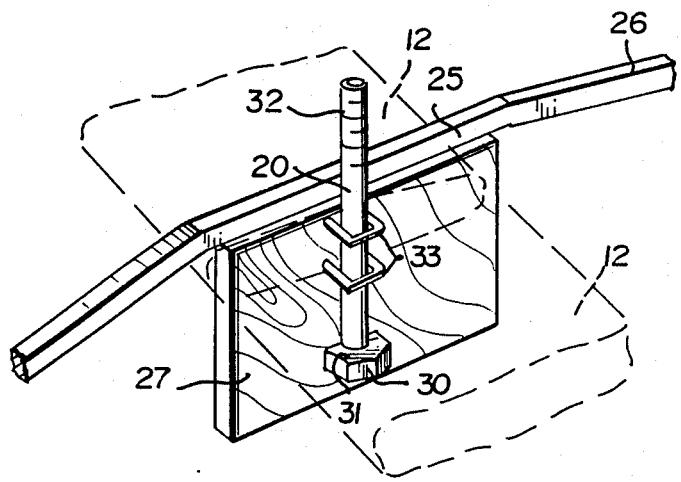
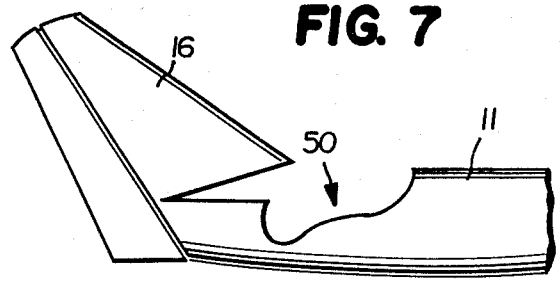
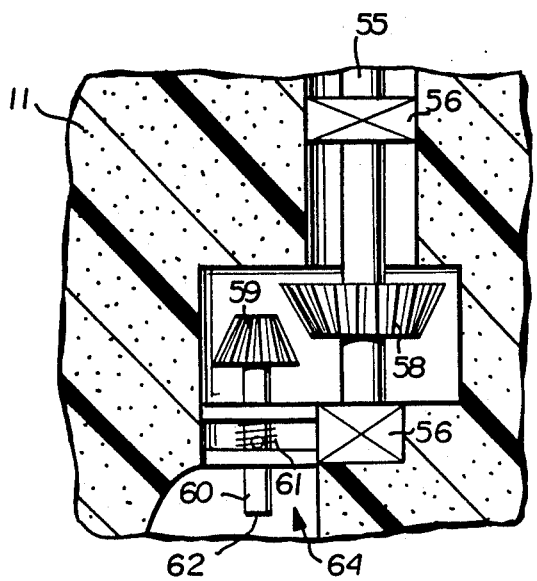
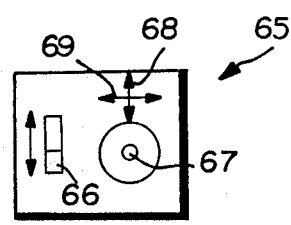

HELICOPTER TARGET

BACKGROUND AND SUMMARY OF THE INVENTION

It is very important for ground troops, and other military personnel, to be able to distinguish between various types of aerial targets, as well as to have realistic practice in bringing down the targets by small arms fire or the like. RS Systems of Beltsville, Md., has developed a wide variety of aerial targets that fit this need for planes, however heretofore a realistic helicopter target has not been provided.

In order for a device to be practically utilized as a target, it must be expendable; that is it must be able to be produced commercially at a relatively low cost (e.g. less than one thousand U.S. 1987 dollars). Yet, at the same time it must accurately simulate a helicopter, including having a rotating main blade assembly, so that it will be effective as a target, and will give those taking target practice the ability to distinguish it from other types of helicopters. That is, the helicopter simulation must be accurate enough so that the military personnel can learn to distinguish between relatively similar friendly and foe helicopters.

According to the present invention, a target helicopter is provided that meets all the necessary criteria for a helicopter target. It is expendable, being able to be produced at a relatively low cost (e.g. less than one thousand U.S. 1987 dollars). It presents a very realistic three-dimensional visual representation of a real helicopter, and is also capable of performing flight patterns that will be encountered in combat (that is simulating the flight of a helicopter).

While the target according to the invention is capable of simulating any helicopter having stub wings, it is particularly desirable for use in the simulation of the Hind D, one of the most effective Soviet combat helicopters. Of course simulation of the U.S. Apache helicopter also may be provided so that military personnel can learn to easily distinguish between foe and friendly helicopters.

The target according to the invention comprises a wheel less, hand launchable remote controlled autogyro. By providing a particularly constructed autogyro, helicopter simulation (both visual and flight pattern) may be provided while allowing inexpensive production since the production of an actual target helicopter would be extraordinarily expensive, and such a target would be very difficult to effectively control by conventional remote control mechanisms. While the target according to the invention simulates the combat flight of a helicopter, it is essentially as easy to control as a conventional remote controlled target plane, such as those manufactured by RS Systems.

The autogyro of the invention has a fuselage section which simulates the fuselage of a helicopter with stub wings. Preferably, the autogyro has a single, only aerodynamically controlled, fixed angle shaft rotor assembly. If there is a necessity for pre-rotation of the rotor to assist in launching, the shaft may be made rotatable and gearing means provided with it to allow for pre-rotation utilizing a hand drill or other common power source, to effect the initial rotation while allowing easy disengagement of the power source from the shaft, and hand launching.

The remote controlled flying target according to the invention includes a fuselage section simulating a helicopter and having fore and aft portions, a rotor, a remote controlled engine for powering the target through the air, a horizontal stabilizer (preferably with elevators), and a pair of wings operatively connected to the fuselage section and extending outwardly therefrom, each wing having an air foil. The rotor includes a rotor shaft upstanding from the fuselage and attached to a rotor head. The rotor shaft is tilted aft a fixed angle of about 5°–10°. The rotor head includes air foil blades having a negative pitch angle between about 3°–7°, and preferably having a conning angle also between about 3°–9°. Remote control elevator and roll and yaw structures are provided, and all of the elements comprising the target are constructed so that the target is capable of flight simulating the combat flight of a helicopter, while the device is useful as an expendable target.

In order to ensure that the target craft is stable and pulled forward through the air, in addition to the rotor being tilted about 5° aft, the engine—which is at the fore of the fuselage—is disposed at a downthrust angle of between about 5°–12° (e.g. 10°) with respect to a line of horizontal movement of the helicopter. Further, the incidence of the horizontal stabilizer, at the rear of the target, is about 3°–10° (e.g. 7°) to the horizontal line of flight.

The rotor is preferably disposed at about the center of lift of the wings, and the wings preferably have a span of between about 50–60 percent the length of the fuselage, so that the wings provide sufficient lift but do not significantly detract from the overall helicopter simulation the target provides.

The wings preferably have ailerons, and the tail is provided having a rudder. The ailerons and rudder are operatively linked together to cooperate to provide effective right or left roll and yaw control. A very simple remote control device may be utilized, including a throttle control for the engine and a joy stick for controlling the elevators, the roll, and yaw.

As previously mentioned, not only is the target according to the invention capable of flight simulating combat flight of a helicopter, but it is hand launchable. Also it may be recovered after use if not shot down (or was used in a tracking or indoctrination session), and reused.

It is the primary object of the present invention to provide an effective helicopter simulating, expendable target. This and other objects of the invention will become clear from an inspection of the detailed description of the invention, and from the appended claims.

BRIEF DESCRIPTION OF THE DRAWINGS

FIG. 5 is a schematic end view of one of the target rotor blades;

FIG. 6 is a perspective view showing exemplary components for mounting the shaft, and for the interior construction of, an exemplary target according to the invention;

FIG. 7 is a detail side view of the aft portion of the fuselage section of the target of FIGS. 1 through 3, with the horizontal stabilizer elements removed;

FIG. 8 is a detail side view, partly in cross-section and partly in elevation, showing exemplary components that may be utilized in an assist for pre-rotation of the target rotor, prior to launching; and FIG. 9 is a top schematic plan view of an exemplary remote control unit for controlling the flight of the target.

DETAILED DESCRIPTION OF THE DRAWINGS

Figure 1:
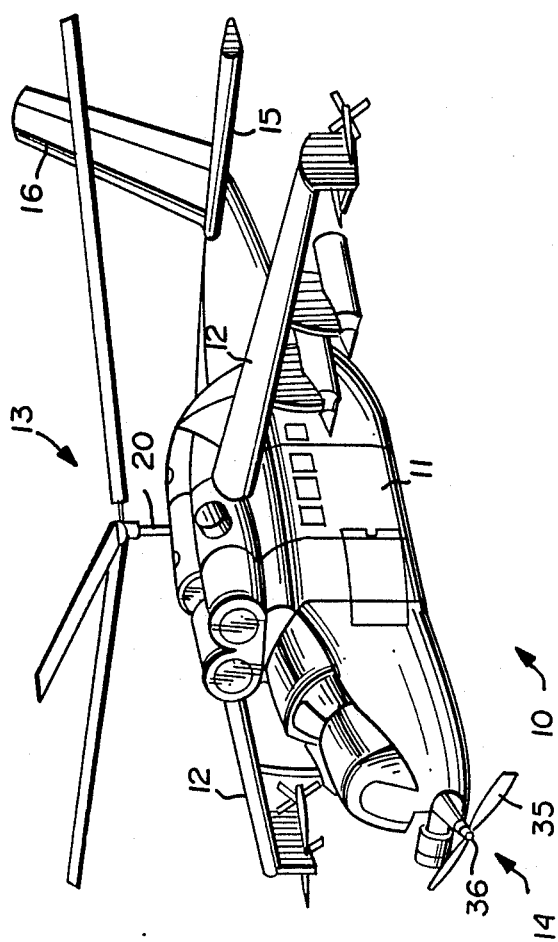
FIG. 1 is a front, top perspective view of an exemplary target according to the present invention.
Figure 2:
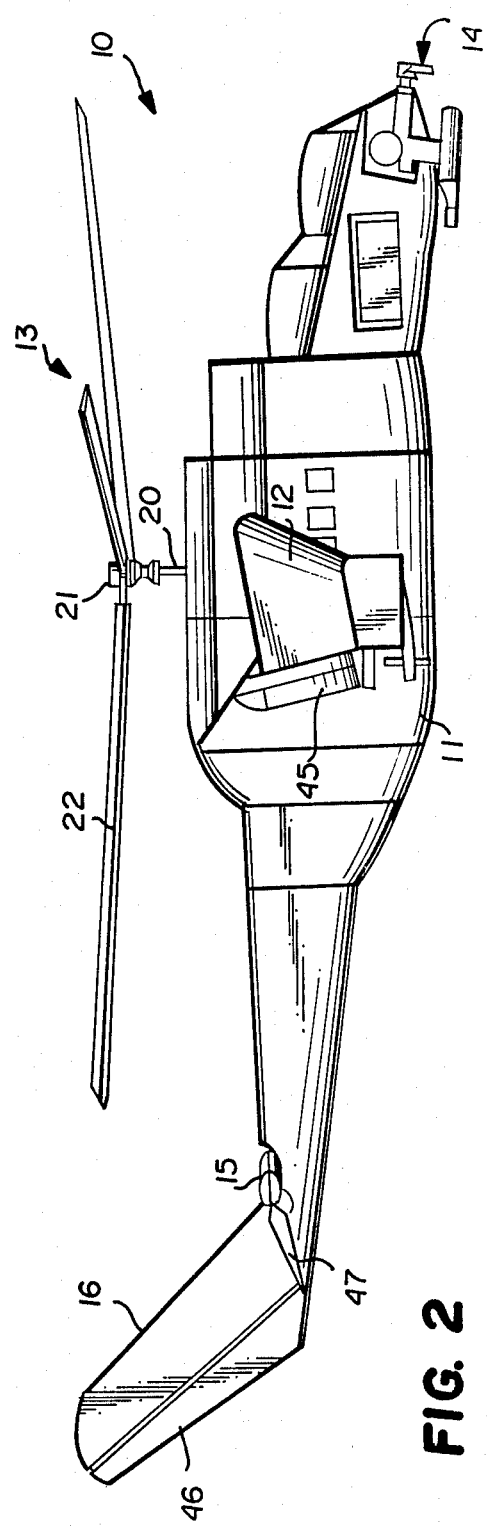
FIG. 2 is a side view of the target of FIG. 1.
Figure 3:
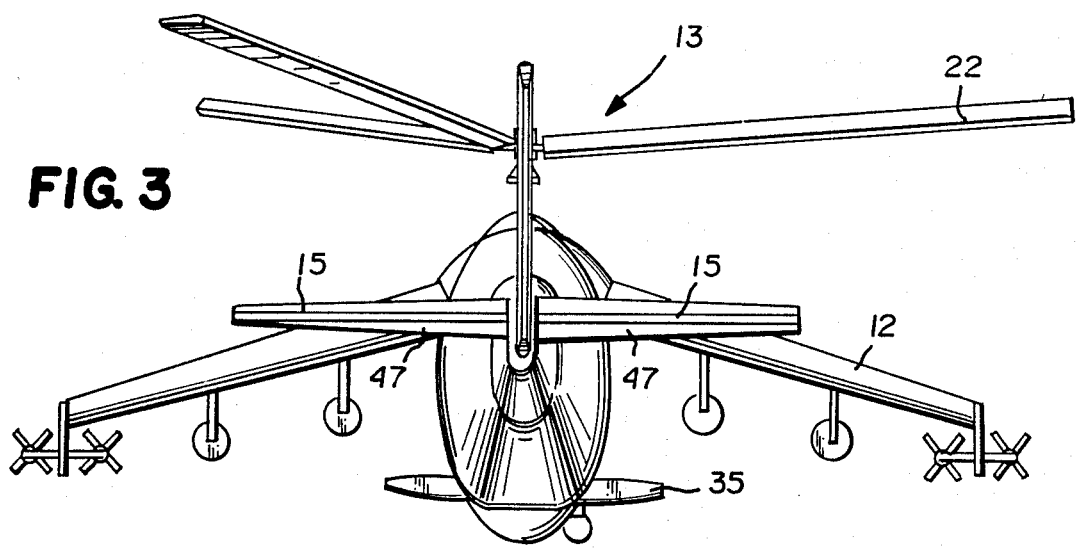
FIG. 3 is a rear view of the target of FIG. 1.

The target according to the present invention is shown generally by reference numeral 10 in FIG. 1 and includes as the major portions thereof a fuselage section 11, wings 12, a rotor assembly shown generally by reference numeral 13, a remote controlled engine shown generally by reference numeral 14, a horizontal stabilizer 15, and a tail 16. The engine 14 is disposed at the fore portion of the fuselage 11, while the tail 16 is at the aft portion.

Note that the fuselage section 11 in the embodiment shown in the drawing simulates a Hind D helicopter. Note that the target 10 provides a very accurate three-dimensional simulation of a Hind D helicopter. However since the target is an autogyro rather than a helicopter there are certain distinctions between it and the real helicopter it simulates, including the particular disposition of the rotor (both with respect to the wings and fuselage), the span of the wings, the position of the horizontal stabilizer with respect to the fuselage, the angular relationship and dispositions of the elements, and of course the provision of a power source (14) at the fore portion of the fuselage.

The engine 14 is a conventional liquid fuel-powered remote controlled engine such as used on conventional remote controlled target planes of RS Systems. The fuselage section 11 is primarily styrofoam, as for conventional RS Systems' target planes, with interior components of other materials as will be hereafter described. The wings 12 also preferably are of styrofoam, while the shaft 20 of the rotor 13 is of metal. The rotor head 21, which includes blades 22, may also be made of metal, with the blades 22 themselves of beech wood or the like. Preferably the rotor is a three-bladed rotor.

As seen in FIG. 6, relatively rigid interior components may be provided for mounting the engine 14, etc., to provide sufficient rigidity for the working components of the target 10 so that it is operational. For example an aluminum generally L-shaped bar (known as a "motor bearer") 25 may be provided to which the motor 14 is attached at end 26 thereof, in a manner conventional for RS Systems' target airplanes, and a piece of relatively rigid sheet material (such as plywood) 27 is provided to which the wings 12 are glued after the wings are moved into abutting engagement with the plywood 27. Openings (not shown) in the styrofoam fuselage will be provided to allow insertion of portions of the wings 12 to abut the plywood 27.

In the embodiment illustrated in FIG. 6, the plywood 27 also comprises a means for mounting the rotor shaft 20, which shaft is fixed, the head portion 21 including bearings to allow rotation of the blades 22 about an axis defined by the shaft 20. The shaft 20 preferably comprises an elongated bolt having a head 30 with a flattened portion thereof 31 at one end, and a screw-threaded portion 32 or the like for receiving a nut (not shown) for holding the head portion 21 in place on the shaft 20. A pair J-bolts 33 or the like may be provided for holding the shaft 20 onto the plywood 27 so that the shaft 20 upstands from the plywood 27 and motor bear 25.

Figure 4:
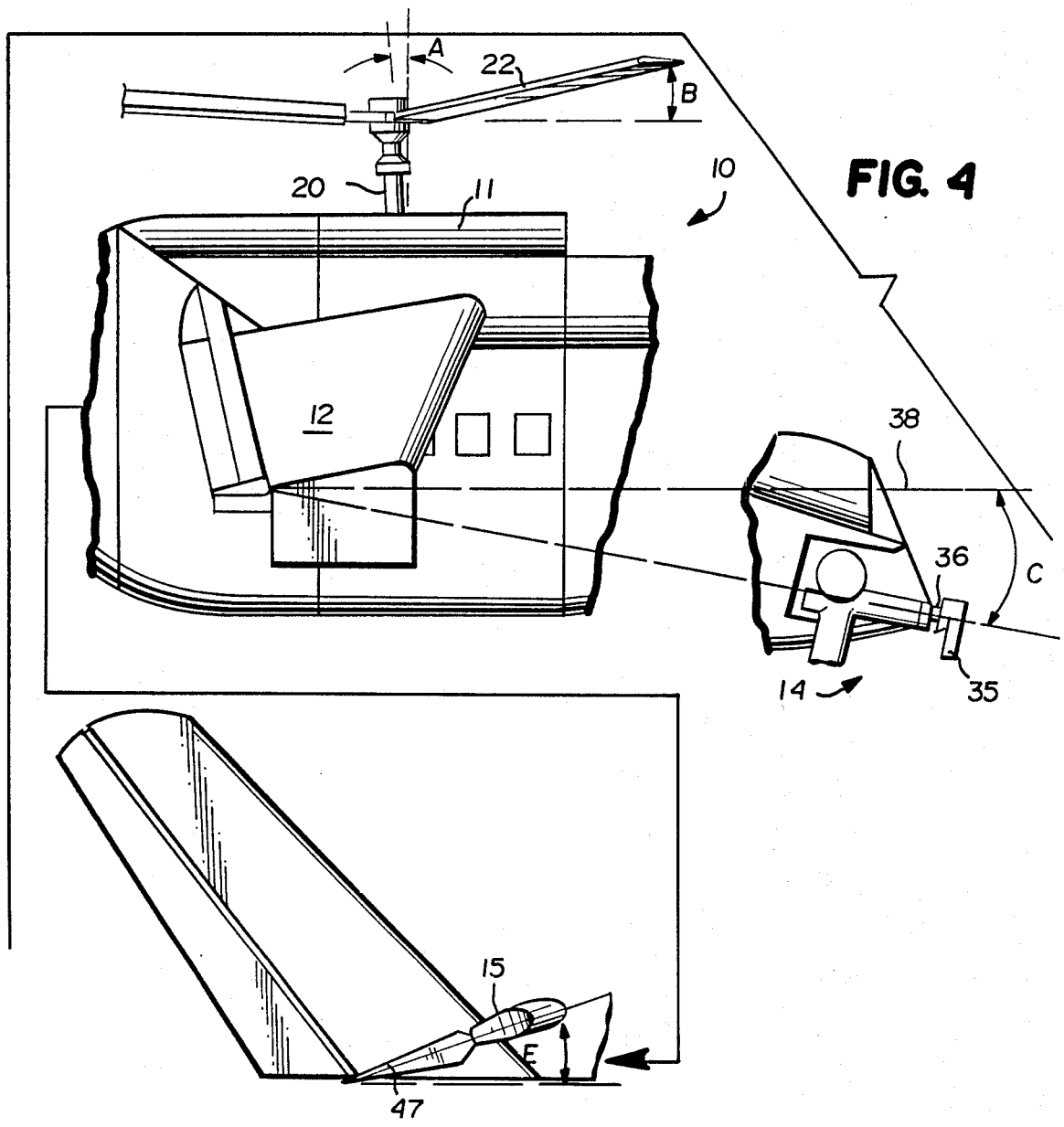
FIG. 4 is a schematic view illustrating the various angular relationships between components of the helicopter of FIGS. 1 through 3.

The various angular dispositions and orientations of the components of the target 10 that allow it to effectively simulate helicopter flight are seen most clearly in FIGS. 4 and 5.

Note that in FIGS. 4 and 5, the angular relationships are greatly exaggerated for clarity of illustration. For example, the angle B is shown at about 30°, when in fact it would only be between about 5°-10°.

The shaft 20 is tilted aft a fixed angle A, which is between about 5°-10°, and the rotor blades 22 preferably have a conning angle B which is between about 3°-9°. The engine 14 includes a propeller 35 and a propeller shaft 36. The engine 14 (actually the propeller shaft 36) has a downthrust angle C with respect to the line 38, the angle C being between about 5°-12°. The line 38 is a datum line extending generally along a horizontal line of travel of the target 10.

The horizontal stabilizer 15 is disposed at an angle E with respect to the datum line 38, or any line parallel thereto. Preferably the angle E is between about 3°-10°, with the horizontal stabilizer 15 sloping downwardly aft. The air foil plates 22 of the rotor 13 (see FIG. 5) provide stability for the target 10, being disposed at a negative pitch angle D which is between about 3°-7°, the edge 40 providing the leading edge of the air foil blade 22 while the edge 41 is the trailing edge.

The shaft 20 (rotor 13) is disposed horizontally along the fuselage 11 at approximately the center of lift of the wings 12, such a disposition of the rotor 13 being illustrated in the drawings. Also, the wings 12 angle slightly downwardly as they move away from the fuselage, and have a significant span, although the area thereof is not too important. The span of the wings 12 typically would be between about 50-60 percent of the length of the fuselage 11. The wing span should be such that the wings 12 provide sufficient lift but do not significantly detract from the overall helicopter simulation the target presents.

In a specific exemplary embodiment of the target 10 according to the invention, the following specific dimensions are provided: fuselage length 85 inches; fuselage height 18 inches; fuselage width 9 inches; wing span 48 inches; rotor diameter 60 inches; angle A 6°; angle B 7°; angle C 10°; angle D 5°; angle E 4°.

In order to provide for effective flight control of the helicopter 10, the wings 12 preferably are provided with ailerons 45, the tail (vertical stabilizer) 16 is provided with a rudder 46, and the horizontal stabilizer 15 has elevators 47. The ailerons 45 and rudder 46 are electrically connected together so that they provide effective roll and yaw control (i.e. right roll and left roll), and the elevators 47 are also remote controlled.

FIG. 7 illustrates the aft portion of the fuselage 11 adjacent the vertical stabilizer 16 and shows a cut-out 50 formed in the styrofoam fuselage section for mounting the horizontal stabilizer at the top of the fuselage section, extending angularly downwardly as described earlier.

In one form of target according to the invention, the rotor shaft is fixed, as illustrated in FIG. 6. The rotor 13 is only aerodynamically controlled. This is distinct from most autogyros which provide some mechanism for adjusting the position of the rotor shaft and/or other components with respect to the fuselage.

A power assist can be provided to help in launching of the target 10. One way that this could be done is illustrated schematically in FIG. 8 in which the shaft 55 is the rotor shaft (connected at the opposite end from that illustrated in FIG. 8 to the rotor head) and is rotatable with respect to the fuselage 11, one or more bearings (schematically illustrated at 56 in FIG. 8) being provided. Adjacent the bottom of the rotor shaft 55 is a first gear 58. A second gear 59 is mounted on a small shaft 60 and is movable against the bias of the coil spring 61 from a first position (illustrated in FIG. 8) in which it is spaced from the gear 58, to a second position wherein the gears 58, 59 engage (mesh). The free end 62 of the shaft 60 typically would be dimensioned and/or shaped so that it could be readily engaged by a power source to effect rotation of the shaft 60, and thereby rotation of the gears 59, 58 and the shaft 55.

In the use of the launch assist illustrated in FIG. 8, the person doing the launching, or a helper, would hold the fuselage 11 in place and access the end 62 of the shaft 60 through the opening 64 provided at the bottom of the fuselage 11 for access-gaining purposes. The shaft end 62 would then be engaged by a power source, such as by an adaptor connected to a hand drill, an upward force would be applied causing the gear 59 to move to its second position against the bias of the spring 61, and rotation of the shaft 60 would be effected, which of course would in turn effect rotation of the rotor shaft 55. Once the desired speed of rotation of the shaft 55 had been achieved, the power source would be removed from operative association with the shaft 60, the gear 59 would move away from the gear 58 under the bias of spring 61, and the target would be hand launched.

FIG. 9 illustrates schematically an exemplary simple remote control unit which may be utilized for use with the target 10. The remote control unit 65, which of course would be held by the person "flying" the target 10, is as simple as that for conventional target planes, such as those of RS Systems. A throttle control lever 66 is movable from an off to a full throttle position, while a joy stick 67 is provided for elevator control, and pitch and yawl control. Movement of the joy stick in the dimensions indicated by line 68 moves the elevators, while movement of the joy stick in the dimension indicated by line 69 effects movement of the rudder and ailerons (which are electrically tied together, as mentioned earlier).

No tail rotor is necessary for proper operation of the target since it is an autogyro, not a helicopter (although it simulates a helicopter). However if desirable, a tail rotor may be attached to the vertical stabilizer 16 for cosmetic purposes.

According to the invention, an autogyro is thus constructed which very accurately simulates a helicopter for target purposes, both visually and by flight pattern. The target 10, with or without the launch assist of FIG. 8, is hand launchable, requiring no wheels or a "take-off" area, which is extremely advantageous considering that the target will often be optimally utilized in rough terrain. Further, the target is constructed having sufficiently good flight characteristics that it can normally land without crashing even though it does not have landing gear, so that it may be reused. With a 1.08 cubic inch engine 14, and the other dimensions set forth in the exemplary embodiment above, the craft is capable of a speed range of between about 10–40 knots, a flight duration of 12 minutes at full throttle or 15 to 18 minutes at a normal cruising speed, and can accurately simulate combat maneuvers of a Hind D. For example, the target 10 according to the invention is capable of performing high speed approaches down to near-hover conditions. For example if wind conditions are right, considering its low stall speed (approximately 10–13 miles per hour), the target can appear to be hovering. Also, the target 10 is capable of tight turns (at less than full throttle), and low speed and gentle landings.

It will thus be seen that according to the present invention an effective target simulating a helicopter has been provided. While the invention has been herein shown and described in what is presently conceived to be the most practical and preferred embodiment thereof, it will be apparent to those of ordinary skill in the art that many modifications may be done thereof within the scope of the invention, which scope is to be accorded broadest interpretation of the appended claims so as to encompass all equivalent structures and devices.

What is claimed is:

1. A wheel less, hand launchable remote controlled autogyro having a fuselage section simulating the fuselage of a helicopter with stub, lift-providing, wings.

2. An autogyro as recited in claim 1 wherein said autogyro has a single, only aerodynamically controlled, fixed angle shaft rotor assembly.

3. An autogyro as recited in claim 2 wherein said rotor shaft comprises a bolt with a flat head part and a screw-threaded part remote from said head; and wherein said rotor assembly further comprises a relatively rigid piece of sheet material; means for mounting said shaft to said sheet material with said flat head portion abutting a face of said sheet material and with said screw-threaded portion upstanding above said sheet material.

4. An autogyro as recited in claim 1 further comprising a rotatable shaft; and manual launch means including a first gear mounted to said shaft for rotation therewith; a second gear; means for mounting the second gear in said fuselage for movement from a first position in which it is spaced from said first gear to a second position in which it engages said first gear to effect rotation thereof; and means for providing access to said second gear from the exterior of said fuselage in order to effect rotation of said first gear.

5. A remote controlled flying target simulating a helicopter with stub wings, and comprising the elements:
    a fuselage section simulating a helicopter and having fore and aft portions;
    a single rotor;
    a remote controlled engine for powering the target through the air, and mounted on said fuselage section;
    a horizontal stabilizer with elevators;
    a pair of wings each having an air foil, attached to said fuselage section and extending outwardly therefrom;
    said rotor including a rotor shaft upstanding from the fuselage and attached to a rotor head; said rotor shaft tilted aft an angle between about 5°–10°;
    said rotor head including air foil blades having a negative pitch angle between about 3°–9°; and
    remote control elevator, and roll and yaw structures;
    said elements constructed so that the target is capable of flight simulating combat maneuvering of a helicopter, and for use as a expendable target.

6. A target as recited in claim 5 wherein said engine is mounted at the front of said fuselage section, and makes a downthrust angle, with respect to a horizontal line of movement of the target, of between about 5°–12°.

7. A target as recited in claim 6 wherein said horizontal stabilizer is disposed at an angle, with respect to the horizontal line of movement of the target, of between about 3°–10°, sloping downwardly aft.

8. A target as recited in claim 7 wherein said wings have ailerons; and further comprising a tail at the aftmost portion of said fuselage, said tail having a rudder; and wherein said rudder and ailerons comprise said roll and yaw structures.

9. A target as recited in claim 8 wherein said ailerons and rudder are operatively linked together to cooperate to provide effective right or left roll and yaw control.

10. A target as recited in claim 8 wherein the span of said wings is between about 50–60 percent the length of said fuselage, so that said wings provide sufficient lift but do not significantly detract from the overall helicopter simulation the target presents.

11. A target as recited in claim 10 wherein the conning angle of said rotor blades is between about 3°–9°.

12. A target as recited in claim 11 wherein said rotor shaft angle is about 6°, and wherein said conning angle is about 7°, and wherein said downthrust angle of said engine is about 10°, and wherein said negative pitch angle of said rotor blades is about 5°, and wherein said angle of said horizontal stabilizer is about 4°.

13. A target as recited in claim 8 wherein said rotor is disposed horizontally along the fuselage at approximately the center of lift of the wings.

14. A target as recited in claim 7 wherein the conning angle of said rotor blades is between about 3°–9°.

15. A target as recited in claim 14 wherein said rotor shaft angle is about 6°, and wherein said conning angle is about 7°, and wherein said down thrust angle of said engine is about 10°, and wherein said negative pitch angle of said rotor blades is about 5°, and wherein said angle of said horizontal stabilizer is about 4°.

16. A target as recited in claim 5 wherein the dispositions of said rotor shaft and said rotor head are such that said rotor is only aerodynamically controlled.

17. A remote controlled autogyro flying target simulating a helicopter with stub wings, comprising:
  a fuselage section simulating a helicopter, and having fore and aft portion;
  a single rotor;
  a remote controlled engine for powering the target through the air, mounted at the fore portion of said fuselage;
  a horizontal stabilizer, said horizontal stabilizer making an angle, with respect to a line of horizontal movement of the target, of between about 3°–10°, sloping downwardly aft;
  a pair of wings connected to said fuselage section extending outwardly therefrom, each wing having an air foil;
  said rotor including a rotor shaft upstanding from the fuselage and attached to a rotor head; said rotor shaft tilted aft a fixed angle of between about 5°–10°;
  said engine making a downthrust angle, with respect to a line of horizontal movement of the target, of between about 5°–12°;
  said rotor head including air foil blades having a negative pitch angle between about 3°–9°; and
  said target constructed so that it is capable of flight simulating combat flight of a helicopter, and use as an expendable target.

18. A target as recited in claim 17 wherein said rotor is disposed horizontally along the fuselage at approximately the center of lift of the wings.

19. A target as recited in claim 18 wherein the span of said wings is between about 50–60 percent the length of said fuselage, so that said wings provide sufficient lift but do not significantly detract from the overall helicopter simulation the target presents.

20. A target as recited in claim 17 wherein the conning angle of said rotor blades is between about 3°–9°.

* * * * *